United States Patent
Kanou et al.

(10) Patent No.: US 9,290,205 B2
(45) Date of Patent: Mar. 22, 2016

(54) CHARACTERISTIC CHANGE DETECTION DEVICE FOR STEERING TRANSMISSION SYSTEM

(71) Applicant: TOYOTA JIDOSHA KABUSHIKI KAISHA, Toyota-shi, Aichi-ken (JP)

(72) Inventors: Takeshi Kanou, Nisshin (JP); Yoshihisa Yamada, Nagoya (JP); Ryouchi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/398,892

(22) PCT Filed: May 22, 2013

(86) PCT No.: PCT/JP2013/003266
§ 371 (c)(1),
(2) Date: Nov. 4, 2014

(87) PCT Pub. No.: WO2013/145790
PCT Pub. Date: Nov. 28, 2013

(65) Prior Publication Data
US 2015/0120134 A1 Apr. 30, 2015

(30) Foreign Application Priority Data

May 22, 2012 (WO) .................. PCT/JP2012/003331

(51) Int. Cl.
*B62D 15/02* (2006.01)
(52) U.S. Cl.
CPC .................................. *B62D 15/0245* (2013.01)
(58) Field of Classification Search
CPC .................................................. B62D 15/0245
See application file for complete search history.

(56) References Cited

FOREIGN PATENT DOCUMENTS

| JP | H11-72508 A | 3/1999 |
| JP | A-2004-276734 | 10/2004 |
| JP | 2005-053447 A | 3/2005 |
| JP | 2012-063184 A | 3/2012 |
| JP | A-2014-94628 | 5/2014 |

*Primary Examiner* — Mussa A Shaawat
(74) *Attorney, Agent, or Firm* — Oliff PLC (57) ABSTRACT

A steering angle zero point detection unit 102 detects a zero point of a steering angle of a steering wheel. A zero point history holding unit 104 records a detection history of zero points. A characteristic change determination unit 116 determines whether or not a characteristic change occurs in the steering transmission system based on a width in the detection history of the zero points.

8 Claims, 8 Drawing Sheets

CHARACTERISTIC CHANGE DETECTION DEVICE FOR STEERING TRANSMISSION SYSTEM

TECHNICAL FIELD

The present invention relates to a technique for detecting a characteristic change in a steering transmission system.

BACKGROUND ART

In a vehicle behavior control technique such as a vehicle stability control (VSC), various controls are performed by using a detection value of a steering angle sensor attached to a steering wheel. When a steering angle sensor that outputs a relative angle is used, a zero point of the steering angle sensor is first detected and an absolute steering angle is calculated based on the detected zero point. Therefore, it is important to accurately detect the steering angle zero point. For example, Patent Literature 1 discloses a technique for detecting the steering angle zero point on the basis of a difference between an estimate yaw rate that is estimated from the detection value of the steering angle sensor and an actual yaw rate detected by a yaw rate sensor.

CITATION LIST

Patent Literature

Patent Literature 1: Japanese Patent Application Laid-Open No. 2004-276734

SUMMARY OF INVENTION

Technical Problem

Many of various components of the steering transmission system from the steering wheel to wheels are supported by an elastic member such as a rubber bush between the component and the frame of the vehicle in order to reduce vibration of the steering wheel, adjust steering feeling, and ensure compliance steer. When the transmission characteristics of the steering transmission system change due to aged deterioration of the elastic members, such as backlash occurring in the steering transmission system, linearity between the steering angle and a tire angle cannot be maintained, so that there is a problem that the steering feeling changes and an estimation accuracy of a vehicle state quantity based on steering angle information degrades.

The present invention is made in view of the above situation, and an object of the present invention is to provide a technique for detecting a characteristic change of elastic members in the steering transmission system while a vehicle is moving.

Solution to Problem

A characteristic change detection device of a steering transmission system according to an aspect of the present invention includes: a detection unit for detecting a zero point of a steering angle of a steering wheel; a history holding unit for recording a detection history of zero points; and a characteristic change determination unit for determining whether or not a characteristic change occurs in the steering transmission system based on a width in the detection history of the zero points.

According to the aspect, a characteristic change in a steering transmission system due to aged deterioration of rubber bushes or the like can be detected.

The characteristic change detection device may further comprise a difference calculation unit for calculating a difference between arbitrary two points among zero points included in the detection history, and the characteristic change determination unit may determine whether or not a characteristic change occurs in the steering transmission system based on a calculation result provided by the difference calculation unit for calculating a difference between arbitrary two points. The arbitrary two points may be a maximum value and a minimum value among zero points included in the detection history. Based on a difference between arbitrary two points, such as the maximum value and the minimum value among zero points, deterioration of an elastic member in the steering transmission system can be detected.

The characteristic change detection device may further comprise a threshold value setting unit for setting a threshold value used to determine a characteristic change in the steering transmission system, and the characteristic change determination unit may determine that a characteristic change occurs in the steering transmission system when the difference between the maximum value and the minimum value among zero points exceeds a predetermined threshold value, during a predetermined period from updating of the maximum value and the minimum value among zero points. The threshold value setting unit may calculate the threshold value based on a lateral acceleration, a yaw rate, and a speed of a vehicle.

The history holding unit may discard a maximum value and a minimum value of zero point detection values at predetermined intervals. Accordingly, false determination caused by using a significantly old zero point detection value can be prevented.

The characteristic change detection device may further comprise a distribution width calculation unit for calculating a distribution width of zero points detected in a predetermined time period when a predetermined number or more of zero points are detected in the predetermined time period by the detection unit, and the characteristic change determination unit may determine that a characteristic change occurs in the steering transmission system when the distribution width is greater than or equal to a threshold value. Accordingly, since steering angle zero point detection values over a relatively long time are used, a characteristic change can be detected even if the steering wheel is not rotated by a large angle in a short time period.

Advantageous Effects of Invention

According to the present invention, it is possible to detect a characteristic change of elastic members in the steering transmission system while a vehicle is moving.

DESCRIPTION OF EMBODIMENTS

Figure 1:
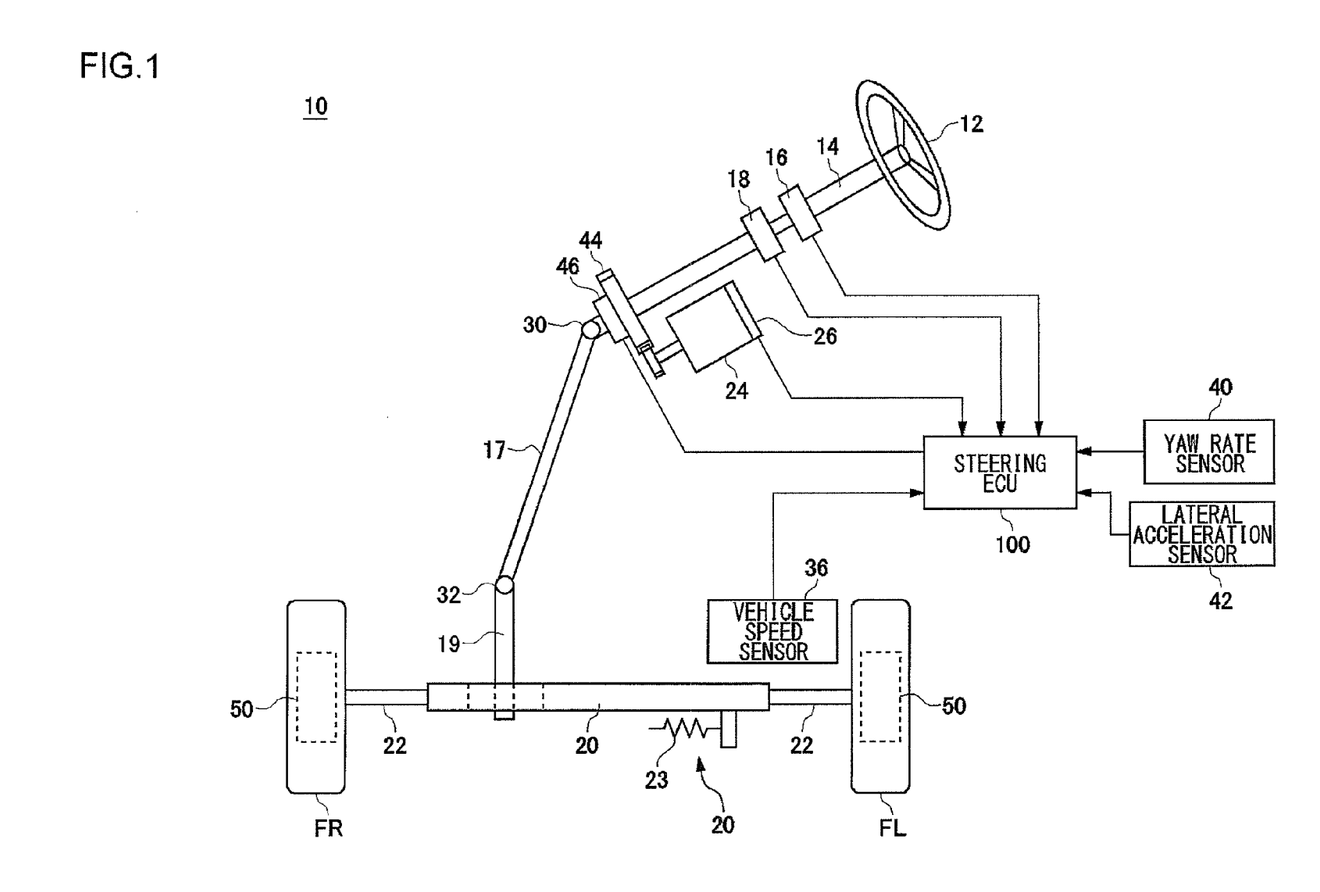
FIG. 1 is a diagram showing a schematic configuration of a vehicle including a characteristic change detection device of a steering transmission system according to a first embodiment of the present invention.

FIG. 1 is a diagram showing a schematic configuration of a vehicle 10 including a characteristic change detection device of a steering transmission system according to a first embodiment of the present invention. FIG. 1 is a schematic diagram of a front-wheel portion of a four-wheel vehicle. A driving direction of the vehicle is changed by steering a right front wheel FR and a left front wheel FL which are steerable wheels.

The vehicle 10 includes an electric power steering device (hereinafter referred to as "EPS"). The EPS includes a steering wheel 12 steered by a driver, a steering shaft 14 linked to the steering wheel, a speed reduction mechanism 44 provided at an lower end of the steering shaft, and a steering assist motor 24 whose output shaft is connected to the speed reduction mechanism 44. The steering assist motor 24 provides an assist force for assisting a steering operation by rotatably driving the steering shaft 14.

The steering shaft 14 is provided with a torsion bar not shown in FIG. 1, a steering torque sensor 16 that detects a torque generated in the torsion bar, and a steering angle sensor 18 that detects a steering angle of the steering wheel 12. Outputs from these sensors are transmitted to a steering electronic control unit (hereinafter referred to as "ECU") 100.

The steering shaft 14 is linked to an intermediate shaft 17 and a pinion shaft 19 through universal joints 30 and 32. The pinion shaft 19 is linked to a rack and pinion mechanism 20 including a rack bar 22 which is extended in the left-right direction of the vehicle (the vehicle width direction) and which slides in a shaft length direction. The intermediate shaft 17 includes a rubber coupling as a part thereof.

The rack and pinion mechanism 20 is configured by engaging pinion teeth formed at one end of the pinion shaft 19 with a rack shaft. The rack and pinion mechanism 20 is supported by a body of the vehicle through a steering gear mount bush 23.

When the driver operates the steering wheel 12, the rotation of the steering shaft 14 is transmitted to the rack and pinion mechanism 20 through the shafts 17 and 19 and converted into a linear movement in the left-right direction of the rack bar 22 by the rack and pinion mechanism 20. One end of a tie rod (not shown in FIG. 1) is connected to each of both ends of the rack bar 22. The other end of the tie rod is linked to a knuckle arm (not shown in FIG. 1) supporting the right front wheel FR or the left front wheel FL. When the rack bar 22 moves linearly, the right front wheel FR and the left front wheel FL are steered.

A vehicle speed sensor 36 which detects the number of rotations of a wheel and outputs a vehicle speed is attached near the wheel. A yaw rate sensor 40 which detects a yaw rate of the vehicle body and a lateral acceleration sensor 42 which detects acceleration in the left-right direction are also provided in the vehicle body. The detection values detected by these sensors are transmitted to the steering ECU 100.

The steering ECU 100 calculates an assist value of a steering torque on the basis of the detection values received from the sensors and outputs a control signal according to the assist value to the steering assist motor 24. The torque supplied to the shaft by the motor is detected by an assist torque sensor 46. The steering mechanism including the EPS as described above is widely known, and thus further detailed description will be omitted in the present specification.

As described above, when characteristic change of the steering transmission system occurs, such as, for example, when backlash in the steering transmission system occurs due to aged deterioration of the elastic members such as the rubber bushes, linearity between the steering angle and the tire angle cannot be maintained, so that there is a problem that the steering feeling changes and the estimation accuracy of the vehicle state quantity based on the steering angle information degrades.

Therefore, in the present embodiment, the characteristic change of the elastic members in the steering transmission system is detected on the basis of information detected by the various sensors attached to the vehicle body while the vehicle is moving.

Figure 2:
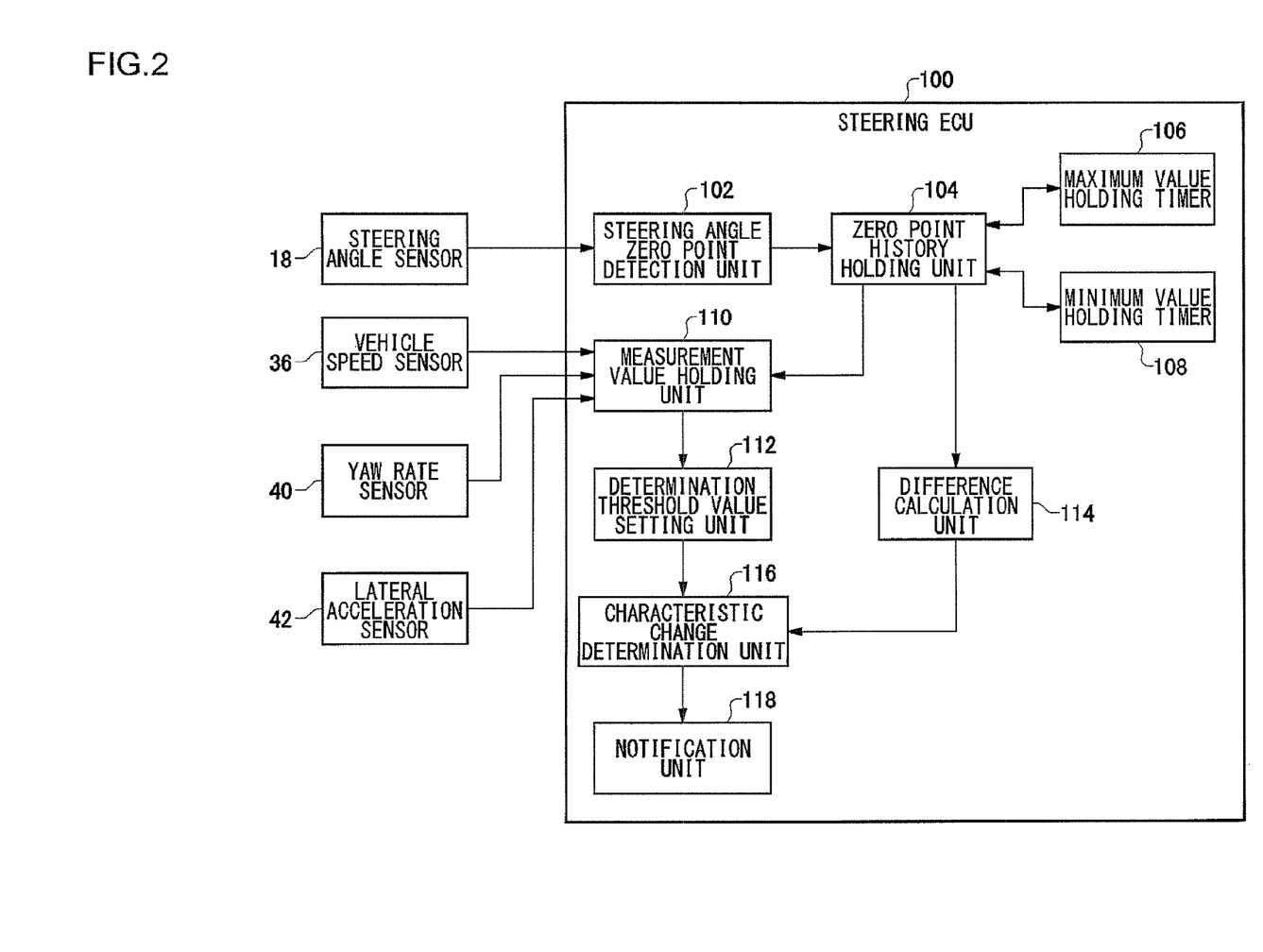
FIG. 2 is a functional block diagram showing a configuration of a portion related to characteristic change detection of the steering transmission system according to the first embodiment in a steering ECU.

FIG. 2 is a functional block diagram showing a configuration of a portion related to characteristic change detection of the steering transmission system according to the present embodiment in the steering ECU 100. The blocks shown in FIG. 2 can be realized by elements and electric circuits such as a CPU and a memory of a computer in hardware or computer programs in software. However, FIG. 2 illustrates functional blocks realized by cooperation of the hardware components and the software components. Therefore, those skilled in the art can understand that these functional blocks can be realized by various forms of combinations of hardware components and software components.

A steering angle zero point detection unit 102 detects a zero point (a neutral point) of the steering angle sensor 18 by any known method. A steering wheel absolute steering angle is calculated on the basis of the detected zero point and used for various vehicle controls.

A zero point history holding unit 104 records a maximum value and a minimum value of the zero points detected by the steering angle zero point detection unit 102 from the previous update. An operation of the zero point history holding unit 104 will be described in detail with reference to a flowchart in FIG. 4.

A maximum value holding timer 106 and a minimum value holding timer 108 are connected to the zero point history holding unit 104. These timers are countdown timers for counting time respectively from when the zero point maximum value and the zero point minimum value are stored in the zero point history holding unit 104. When a count value in the maximum value holding timer 106 or the minimum value holding timer 108 reaches a predetermined value, the zero point history holding unit 104 discards the zero point maximum value or the zero point minimum value stored at that time. This operation will be described in detail with reference to FIGS. 4 and 5.

A measurement value holding unit 110 receives detection values from the vehicle speed sensor 36, the yaw rate sensor 40, and the lateral acceleration sensor 42 and stores a vehicle speed, a yaw rate, and a lateral acceleration when the zero point maximum value or the zero point minimum value in the zero point history holding unit 104 is updated.

A determination threshold value setting unit 112 calculates a determination threshold value for determining a characteristic change in the steering transmission system, specifically the presence or absence of the occurrence of backlash due to deterioration of rubber bushes, by using the vehicle speed, the yaw rate, and the lateral acceleration recorded in the measurement value holding unit 110.

The determination threshold value is set considering errors of the vehicle speed sensor, the yaw rate sensor, the lateral acceleration sensor, and the steering angle sensor, variation in manufacturing of components, and variation in assembly of the vehicle. The details of the setting will be described later with reference to FIG. 5. Instead of the above, a history of zero point detection in a normal vehicle is obtained and a value significantly larger (for example, two times larger) than the obtained result may be selected as the determination threshold value.

A difference calculation unit 114 calculates a difference between the zero point maximum value and the zero point minimum value recorded in the zero point history holding unit 104.

A characteristic change determination unit 116 determines whether or not the difference calculated by the difference calculation unit 114 exceeds the determination threshold value. When the difference exceeds the determination threshold value, it determines that a characteristic change occurs in the steering transmission system.

When it is determined that a characteristic change occurs by the characteristic change determination unit 116, a notification unit 118 notifies a driver of the vehicle of the fact or instructs a vehicle control ECU (not shown in FIG. 2) to stop execution of various vehicle controls using the steering angle.

Figure 3:
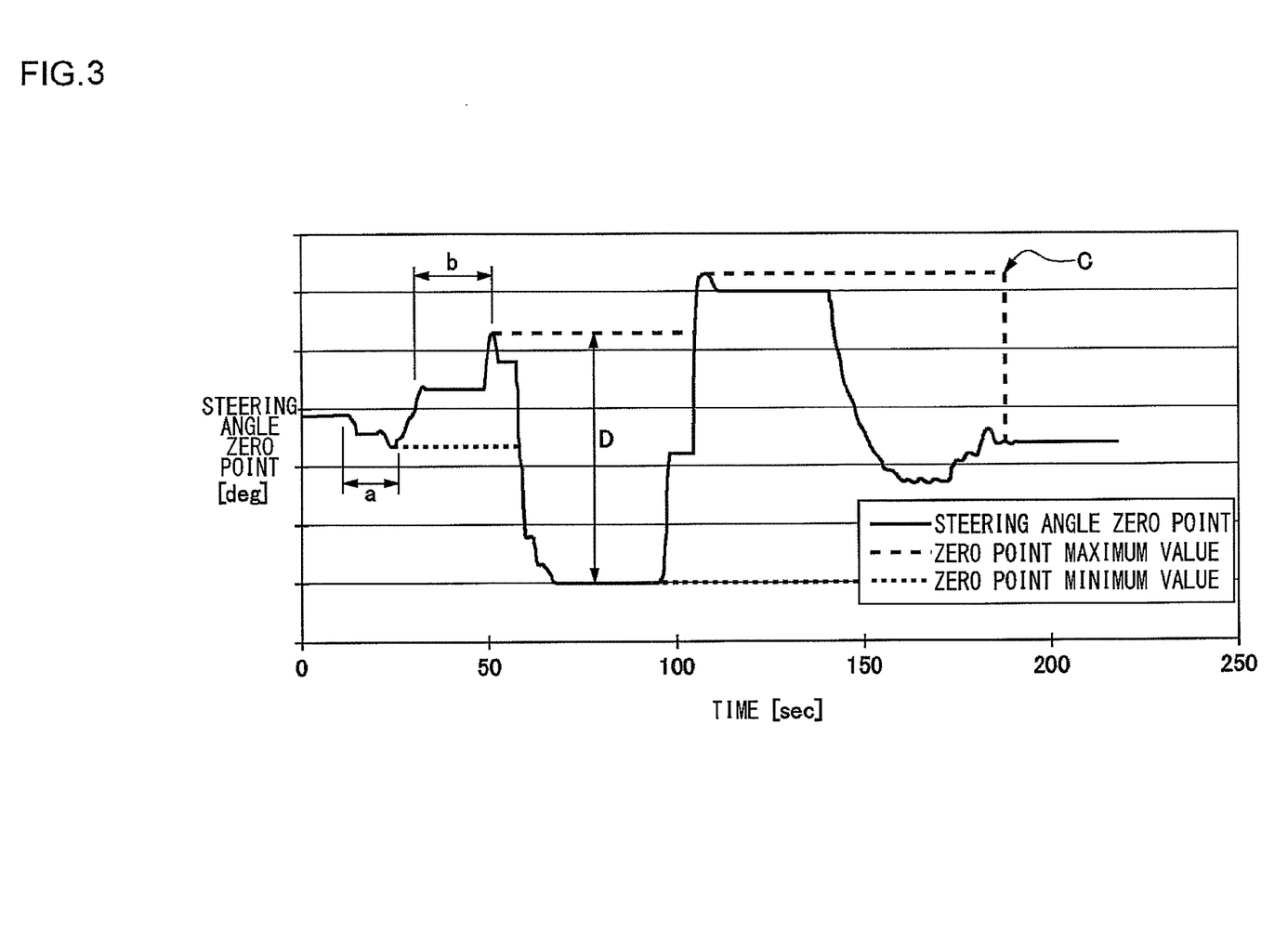
FIG. 3 is a graph showing an example of a history of a zero point maximum value and a zero point minimum value.

Next, an action of the characteristic change detection device according to the present embodiment will be described with reference to FIG. 3. FIG. 3 is a graph showing an example of the history of the zero point maximum value and the zero point minimum value.

In FIG. 3, the horizontal axis represents an elapsed time and the vertical axis indicates a detected steering angle zero point θ. In the description below, it is assumed that the zero point maximum value and the zero point minimum value are reset at the time 0.

In a time period a indicated in FIG. 3, the steering angle zero point detection value is smaller than the zero point minimum value, so that the zero point history holding unit 104 updates the zero point minimum value. On the other hand, in a time period b indicated in FIG. 3, the steering angle zero point detection value is greater than the zero point maximum value, so that the zero point history holding unit 104 updates the zero point maximum value. Thereafter, when the steering angle zero point detection value becomes greater than the zero point maximum value or smaller than the zero point minimum value, the zero point maximum value or the zero point minimum value is updated accordingly.

The difference calculation unit 114 calculates a difference D between the zero point maximum value and the zero point minimum value. The characteristic change determination unit 116 compares a threshold value T set by the determination threshold value setting unit 112 and the difference D, and when the difference D exceeds the threshold value T, the characteristic change determination unit 116 determines that a change of the characteristic of the steering transmission system (that is, deterioration of the elastic members) occurs. This uses a fact that when backlash occurs due to deterioration of the elastic members in the steering transmission system, the steering angle zero point detection value is assumed to largely change during operation of the steering wheel.

The maximum value holding timer 106 counts elapsed time from when the zero point maximum value is most recently updated. The minimum value holding timer 108 counts elapsed time from when the zero point minimum value is most recently updated. When a predetermined time has elapsed, the zero point history holding unit 104 resets the zero point maximum value or the zero point minimum value with the steering angle zero point detection value at that time. In FIG. 3, a change of the zero point maximum value at a point c corresponds to the process described above.

Figure 4:
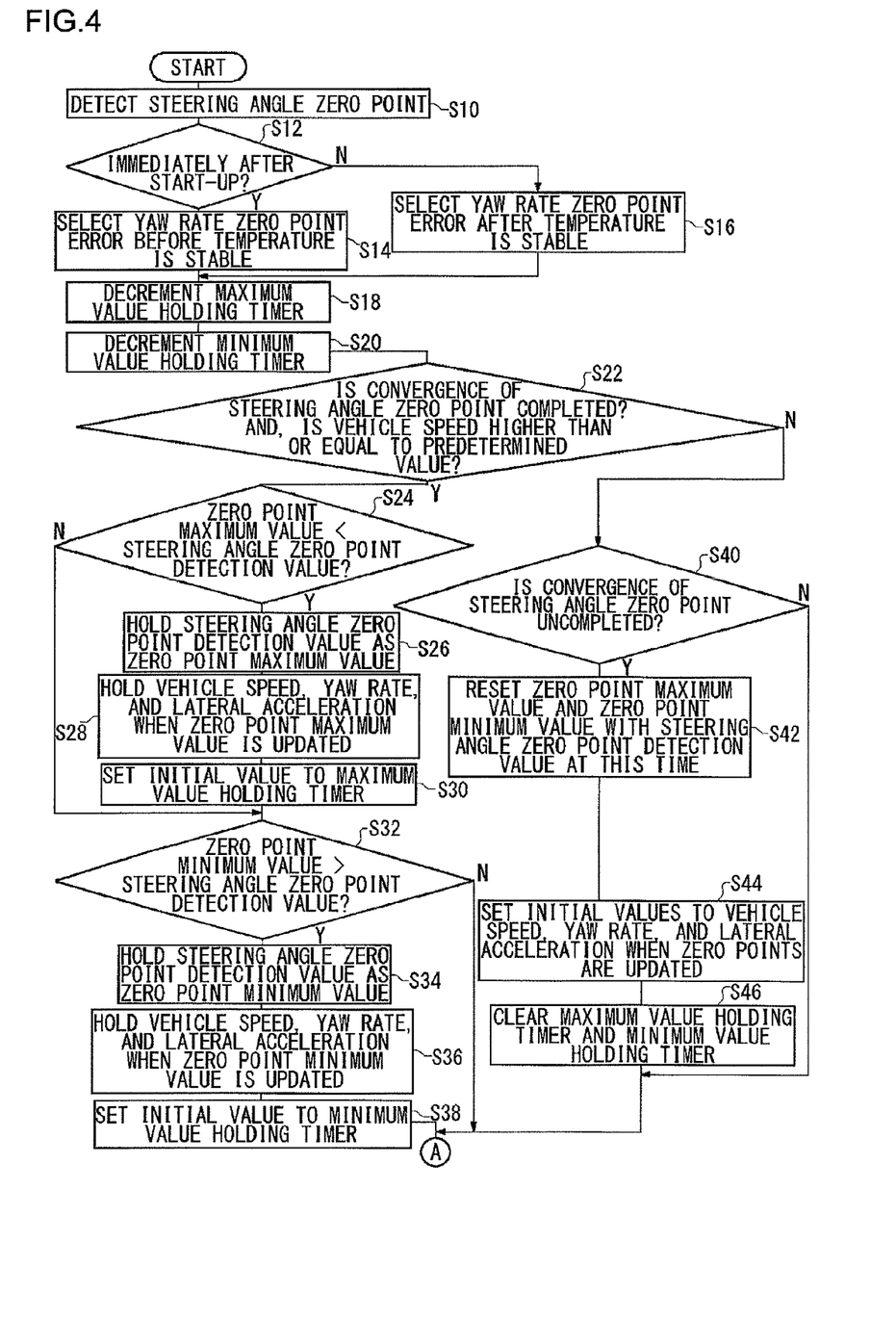
FIG. 4 is a flowchart showing an operation of the characteristic change detection device according to the first embodiment.
Figure 5:
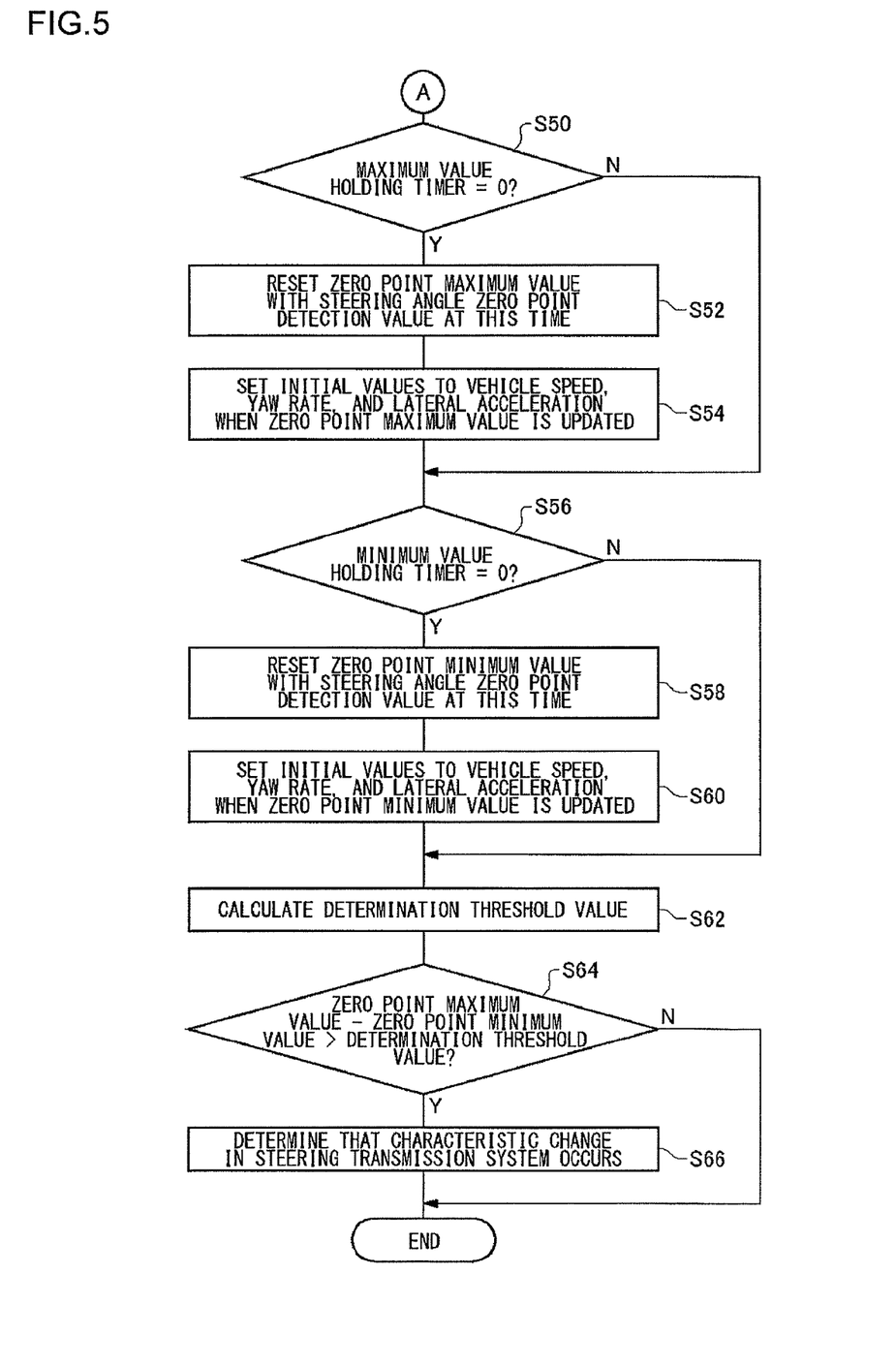
FIG. 5 is a flowchart showing an operation of the characteristic change detection device according to the first embodiment.

FIGS. 4 and 5 are a flowchart showing an operation of the characteristic change detection device according to the first embodiment. This flow is repeatedly performed at predetermined intervals (for example, one second) while the vehicle is moving.

First, the steering angle zero point detection unit 102 detects the steering angle zero point θ of the steering wheel on the basis of the detection value of the steering angle sensor 18 (S10). The determination threshold value setting unit 112 determines whether or not it is immediately after start-up of the vehicle (S12). If it is immediately after start-up of the vehicle (Y in S12), it is assumed that the temperature of the yaw rate sensor 40 is not stable, so that a yaw rate zero point error before the temperature becomes stable is selected (S14). If it is not immediately after start-up of the vehicle (N in S12), it is assumed that the temperature of the yaw rate sensor 40 is stable, so that a yaw rate zero point error after the temperature becomes stable is selected (S16).

Subsequently, the zero point history holding unit 104 decrements the maximum value holding timer 106 and the minimum value holding timer 108 (S18 and S20). Initial values are set in these timers in steps S30 and S38 described later. The initial values are not set immediately after start-up, so that lower limit guard values are set to zero.

The determination threshold value setting unit 112 determines whether or not convergence of the steering angle zero point is completed and the vehicle speed is higher than or equal to a predetermined value (S22). When the vehicle speed is low, an error due to variation of components and tolerances of sensors tends to be larger than that when the vehicle speed is high, so that there is high possibility that a characteristic change is falsely determined. Therefore, when the vehicle speed is low (for example, lower than 30 km/h), characteristic change detection of the steering transmission system is not performed.

When the vehicle speed is lower than the predetermined value (N in S22), the determination threshold value setting unit 22 determines whether or not convergence of the steering angle zero point is uncompleted (S40). In a first determination, the convergence of the steering angle zero point is uncompleted (Y in S40), so that the zero point history holding unit 104 proceeds to S42 and resets the stored zero point maximum value and the zero point minimum value with the steering angle zero point detection value at this time (S42). Accordingly, the measurement value holding unit 110 stores the vehicle speed, the yaw rate, and the lateral acceleration when the reset is performed as initial values. The zero point history holding unit 104 resets the zero point maximum value holding timer 106 and the zero point minimum value holding timer 108 (S46). In S40, when the convergence of the steering angle zero point is completed (N in S40), S42 to S46 are skipped.

In S22, when the convergence of the steering angle zero point is completed and the vehicle speed is higher than or equal to the predetermined value (Y in S22), the zero point history holding unit 104 determines whether or not the steering angle zero point detection value at this time is greater than the stored zero point maximum value, that is, whether or not the zero point maximum value needs to be updated (S24). When the steering angle zero point detection value is smaller than or equal to the zero point maximum value (N in S24), S26 to S30 are skipped. When the steering angle zero point detection value is greater than the zero point maximum value (Y in S24), the zero point history holding unit 104 stores the steering angle zero point detection value as a new zero point maximum value (S26) and the measurement value holding unit 110 stores the vehicle speed, the yaw rate, and the lateral acceleration when the maximum value is updated (S28). A predetermined initial value (for example, 180 seconds) is set in the maximum value holding timer 106 (S30).

The zero point history holding unit 104 determines whether or not the steering angle zero point detection value at this time is smaller than the stored zero point minimum value, that is, whether or not the zero point minimum value needs to be updated (S32). When the steering angle zero point detection value is greater than or equal to the zero point minimum value (N in S32), S34 to S38 are skipped. When the steering angle zero point detection value is smaller than the zero point minimum value (Y in S32), the zero point history holding unit 104 stores the steering angle zero point detection value as a new zero point minimum value (S34) and the measurement value holding unit 110 stores the vehicle speed, the yaw rate, and the lateral acceleration when the minimum value is updated (S36). A predetermined initial value is set in the minimum value holding timer 108 (S38).

Next, let us see FIG. 5. The zero point history holding unit 104 determines whether or not the count of the maximum value holding timer is zero (S50). When the count is zero (Y in S50), the zero point history holding unit 104 resets the stored zero point maximum value with the steering angle zero point detection value at this time (S52) and the measurement value holding unit 110 also resets the vehicle speed, the yaw rate, and the lateral acceleration which are stored in the measurement value holding unit 110 with the initial values when the maximum value is updated (S54).

Further, the zero point history holding unit 104 determines whether or not the count of the minimum value holding timer is zero (S56). When the count is zero (Y in S56), the zero point history holding unit 104 resets the stored zero point minimum value with the steering angle zero point detection value at this time (S58) and the measurement value holding unit 110 also resets the vehicle speed, the yaw rate, and the lateral acceleration which are stored in the measurement value holding unit 110 with the initial values when the minimum value is updated (S60).

The process from S50 to S60 corresponds to the reset of the zero point maximum value and the zero point minimum value performed in order to exclude influence of variation of the zero point of the steering angle sensor due to temperature change as much as possible. The reason why the process is performed is as follows. The zero point of an analog sensor such as the yaw rate sensor 40 and the lateral acceleration sensor 42 may vary according to temperature change. When the zero points of the sensors vary due to temperature change in a vehicle interior, the detection value of the steering angle zero point also varies, so that it is difficult to distinguish whether the difference D of the steering angle zero point is caused by a characteristic change in the steering transmission system or the temperature change. Therefore, taking into account that the temperature change in a vehicle interior in a short time period is very small in a normal environment, the zero point maximum value and the zero point minimum value are discarded every time a predetermined time period elapses from the previous update.

Subsequently, the determination threshold value setting unit 112 calculates the determination threshold value T based on the formula below (S62).

$$T = \{(\theta \cdot V)/(n \cdot L) - Kh \cdot Gy \cdot V - YR\} \cdot n \cdot L \cdot (1/V) \quad (1)$$
$$= \theta - Kh \cdot Gy/n \cdot L - YR \cdot n \cdot L \cdot (1/V)$$

where, $\theta$ represents a steering angle detection value, V represents a vehicle speed, Gy represents a lateral acceleration, YR represents a yaw rate, Kh represents a stability factor, n represents a steering overall gear ratio, and L represents a wheel base.

In the first line of the formula (1), $(\theta \cdot V)/(n \cdot L) - Kh \cdot Gy \cdot V$ corresponds to a target yaw rate. Therefore, $\{(\theta \cdot V)/(n \cdot L) - Kh \cdot Gy \cdot V - YR\} \cdot n \cdot L \cdot (1/V)$ corresponds to obtaining a steering angle reduced value of (target yaw rate–actual yaw rate).

The formula (1) corresponds to a total value of
a steering angle error caused by an zero point/gain error of the steering angle sensor and a zero point error of the lateral acceleration sensor,
a steering angle error caused by a gain error of the lateral acceleration sensor and variation of the vehicle,
a steering angle error caused by a zero point error of the yaw rate sensor, and
a steering angle error caused by gain errors of the yaw rate sensor and the vehicle speed sensor.

Regarding the vehicle speed, the yaw rate, and the lateral acceleration which are substituted into the above formula (1), it is preferable to select the smaller vehicle speed, the larger yaw rate, and the larger acceleration between the values stored in the measurement value holding unit 110 (that is, between the value stored when the zero point maximum value is updated and the value stored when the zero point minimum value is updated). The reason of this is because the steering angle error during low speed tends to be larger than that during high speed, so that if the steering angle error calculated to be large during low speed driving and the determination threshold value calculated to be small during high speed driving are compared, there is a risk that a characteristic change may be falsely determined, and thus the risk should be avoided.

The difference calculation unit 114 calculates a difference D between the zero point maximum value and the zero point minimum value held in the zero point history holding unit 104 and the characteristic change determination unit 116 determines whether or not the difference D is larger than the determination threshold value T (S64). When the difference D is larger than the determination threshold value T (Y in S64), the characteristic change determination unit 116 determines that a characteristic change of the steering transmission system occurs (S66) and the notification unit 118 notifies the driver accordingly by turning on a predetermined lamp, a buzzer and the like and instructs the vehicle control ECU to temporarily stop the vehicle control based on the detection of the steering angle zero point (S66).

The process in S64 determines whether or not a variation width of the steering angle zero point, that is, the difference D between the zero point maximum value and the zero point minimum value, exceeds the determination threshold value T which is a sum of the zero point errors and the gain errors of the steering angle sensor, the vehicle speed sensor, the lateral acceleration sensor, and the yaw rate sensor and the variation of the vehicle. In other words, when the variation width of the steering angle zero point is larger than a sum of assumable errors of the sensors, it is determined that a shift of the steering angle zero point caused by backlash in the steering transmission system occurs.

As described above, according to the first embodiment, it is possible to detect a characteristic change in the steering transmission system due to aged deterioration of rubber bushes or the like. In particular, in the present embodiment, if the zero point maximum value and the zero point minimum value held in the zero point history holding unit are not updated for a certain time period, the zero point maximum value and the zero point minimum value are discarded and a new zero point maximum value and a new zero point minimum value are recorded. Therefore, it can be said that the present embodiment is suited to detect a characteristic change in a relatively short time period.

Next, a vehicle control device according to a second embodiment of the present invention will be described. Different from the first embodiment, the present embodiment records history of the steering zero point in one trip (that is, a period from the start of the engine to the stop of the engine) of a vehicle for each trip, calculates a distribution width between the histories, and determines the presence or absence of a characteristic change in the steering transmission system by comparing the distribution width and the determination threshold value.

Figure 6:
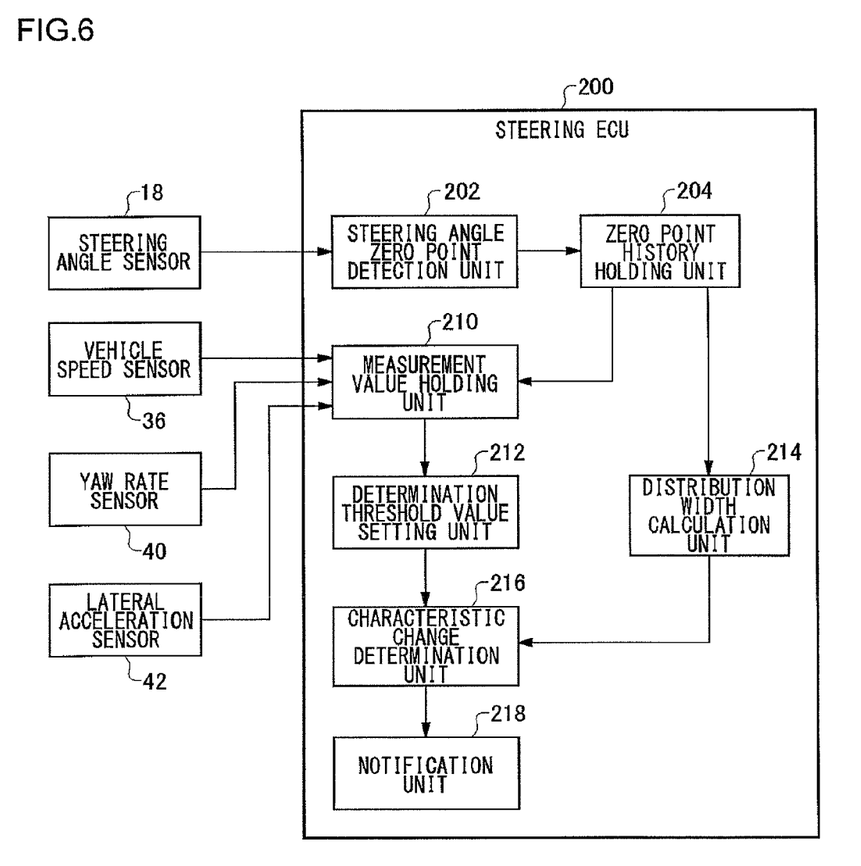
FIG. 6 is a functional block diagram showing a configuration of a vehicle control device according to a second embodiment of the present invention.

FIG. 6 is a functional block diagram showing a configuration of the vehicle control device according to the second embodiment of the present invention. Again, the functional blocks can be realized by various forms of combinations of hardware components and software components.

A steering angle zero point detection unit 202 detects a zero point (a neutral point) of the steering angle sensor 18 by any known method. A steering wheel absolute steering angle is calculated on the basis of the detected zero point and used for various vehicle controls.

A zero point history holding unit 204 holds a history of the zero points detected by the steering angle zero point detection unit 202.

A measurement value holding unit 210 receives detection values from the vehicle speed sensor 36, the yaw rate sensor 40 and the lateral acceleration sensor, 42 and stores a vehicle speed, a yaw rate and a lateral acceleration when the zero point maximum value or the zero point minimum value in the zero point history holding unit 204 is updated.

A determination threshold value setting unit 212 calculates a determination threshold value for determining a characteristic change in the steering transmission system, specifically the presence or absence of the occurrence of backlash due to deterioration of rubber bushes, by using the vehicle speed, the yaw rate and the lateral acceleration recorded in the measurement value holding unit 210.

A distribution width calculation unit 214 calculates a distribution width of the zero point detection values stored in the zero point history holding unit 204 in one trip (that is, from when ignition is turned onto when ignition is turned off). The distribution width may simply be a difference between the maximum value of the zero point detection value and the minimum value of the zero point detection value or may be a standard deviation. When the number of samples of the zero point detection value is small, the distribution width may not be accurate. So the distribution width may be calculated only when the zero points, the number of which is greater than or equal to a predetermined number, can be detected in one trip.

A characteristic change determination unit 216 determines whether or not the distribution width obtained by the distribution width calculation unit 214 exceeds the determination threshold value. When the distribution width exceeds the determination threshold value, it determines that a characteristic change occurs in the steering transmission system.

When it is determined that a characteristic change occurs by the characteristic change determination unit 216, a notification unit 218 notifies a driver of the vehicle of the fact or instructs a vehicle control ECU (not shown in FIG. 6) to stop execution of various vehicle controls using the steering angle.

Next, an action of the characteristic change detection device according to the present embodiment will be described with reference to FIG. 7.

Figure 7A:
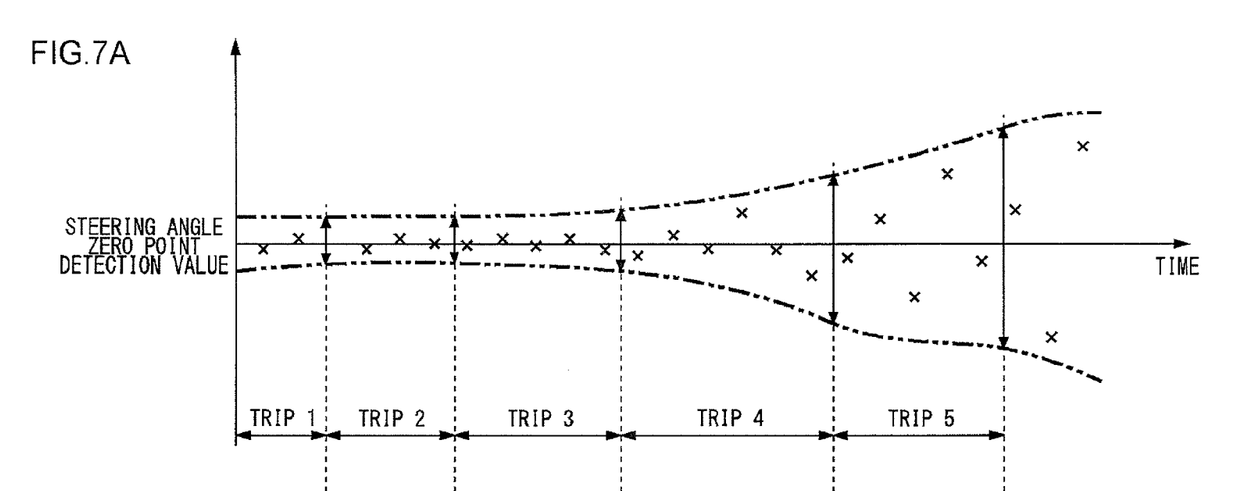
FIGS. 7A and 7B are graphs for explaining an action of a characteristic change detection device according to the second embodiment.
Figure 7B:
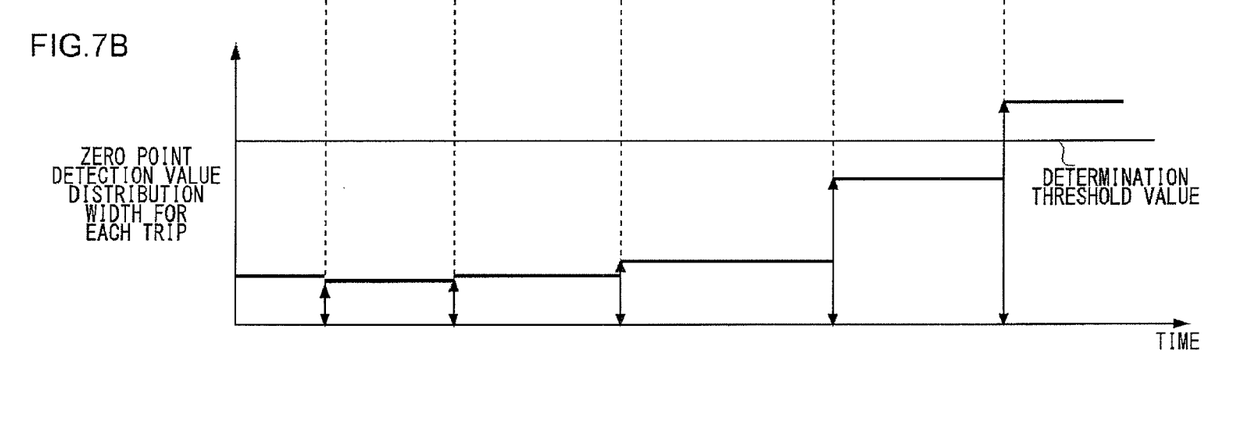

In FIG. 7A, the horizontal axis represents an elapsed time and the vertical axis indicates a steering angle zero point detection value. The elapsed time corresponds to a time period of five trips 1 to 5. Two-dot chain lines in FIG. 7A indicate a distribution range of the steering angle zero point detection values. The distribution width calculation unit 214 calculates a distribution width of the zero point detection values (indicated by arrows in the vertical direction) for each trip. FIG. 7B is a graph showing aligned lower limits of the distribution width. It can be seen that the distribution width calculated for the trip 5 exceeds the determination threshold value (indicated by a bold line in FIG. 7B). At this time point, it is determined that a characteristic change occurs.

Figure 8:
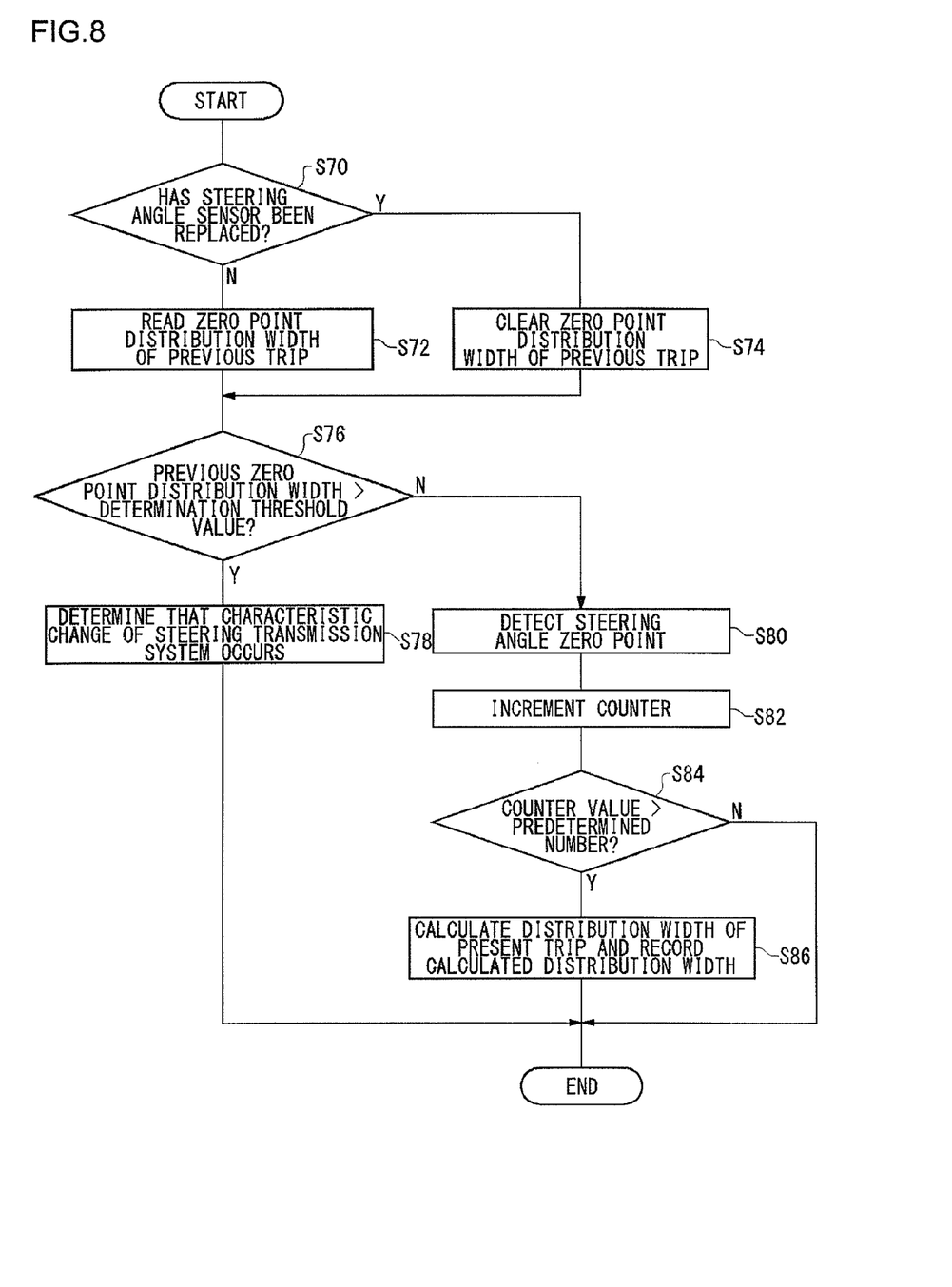
FIG. 8 is a flowchart showing an operation of the characteristic change detection device according to the second embodiment.

FIG. 8 is a flowchart showing an operation of the characteristic change detection device according to the second embodiment. For example, this flow starts when ignition is turned on.

First, it is determined whether or not the steering angle sensor has been replaced. When the steering angle sensor has been replaced (Y in S70), the distribution width stored in the zero point history holding unit 204 is cleared (S74). When the steering angle sensor has not been replaced (N in S70), the characteristic change determination unit 216 reads the distribution width which is obtained for the previous trip and which is stored in the zero point history holding unit 204 (S72).

The characteristic change determination unit 216 determines whether or not the previous zero point distribution width exceeds the determination threshold value set by the determination threshold value setting unit 212 (S76). The determination threshold value is calculated by the above formula (1) in the same manner as in the first embodiment. When the previous zero point distribution width exceeds the determination threshold value (Y in S76), the characteristic change determination unit 216 determines that a characteristic change of the steering transmission system occurs (S78) and the notification unit 218 notifies the driver accordingly by turning on a predetermined lamp, a buzzer and the like and instructs the vehicle control ECU to temporarily stop the vehicle control based on the detection of the steering angle zero point.

In step S76, when the previous zero point distribution width is smaller than or equal to the determination threshold value (N in S76), the zero point history holding unit 204 records the steering angle zero point detected in the present trip (S80) and increments a counter each time the zero point history holding unit 204 records the steering angle zero point (S82). When the counter value exceeds a predetermined number (S84), the distribution width calculation unit 214 calculates a distribution width of the steering angle zero points recorded so far and records the distribution width (S86). The recorded distribution width will be read in S72 of the next trip. The calculation of the distribution width may be performed when the ignition is turned off.

As described above, according to the second embodiment of the present invention, it is possible to detect a characteristic change in the steering transmission system due to aged deterioration of rubber bushes or the like for each trip.

For example, depending on the manner of driving of a driver and a state of a road on which the vehicle is moving, it is assumed that there is a case in which the steering wheel is not rotated by a large angle in a short time period. In this case, there is a possibility that a characteristic change cannot be detected by the method of the first embodiment. In the second embodiment, the steering angle zero point detection values over a time period longer than that of the first embodiment are used, so that even in the cases above, a characteristic change can be detected.

The present invention has been described based on the embodiments. These embodiments are only exemplary examples and those skilled in the art understand that modified examples such as any combination of the embodiments and any combination of the components and processes of the embodiments are within the scope of the present invention.

The present invention is not limited to the above embodiments and modifications such as various design changes can be made on the basis of knowledge of those skilled in the art. The configurations illustrated in the drawings are intended to describe an example, and the configurations can be arbitrarily changed as long as the configuration can achieve the same function.

In the aforementioned first embodiment, it is described to determines whether or not a characteristic change occurs in the steering transmission system based on the difference between the maximum value and the minimum value in the detection history. In the aforementioned second embodiment, it is described to determine whether or not a characteristic change occurs in the steering transmission system based on the distribution width of zero points during a predetermined period. Additionally, the characteristic change determination unit may determine whether or not a characteristic change occurs in the steering transmission system based on the difference between the arbitrary two points among the zero points included in the detection history. For example, the characteristic change determination unit may use second maximum value instead of the maximum value of the zero points in the detection history, or may use second minimum value instead of the minimum value of the zero points in the detection history, or may use both of them. In other words, the concept that the reference value to determine whether or not there is a shift of the steering angle zero point due to the backlash of the steering transmission system is derived from the detection history of the zero points is within the scope of the present invention.

Some embodiments have been described with reference to a vehicle including an electric power steering device. However, the present invention can also be applied to a vehicle including a hydraulic power steering device. In this case, the vehicle does not include a steering ECU, so that an ECU of a braking control device (for example, VSC or the like) is configured to perform detection of a characteristic change in the steering transmission system according to the present invention.

REFERENCE SIGNS LIST

10: vehicle, 12: steering wheel, 18: steering angle sensor, 36: vehicle speed sensor, 40: yaw rate sensor, 42: lateral acceleration sensor, 100: steering ECU, 102: steering angle zero point detection unit, 104: zero point history holding unit, 110: measurement value holding unit, 112: determination threshold value setting unit, 114: difference calculation unit, 116: characteristic change determination unit, 200: steering ECU, 202: steering angle zero point detection unit, 204: zero point history holding unit, 210: measurement value holding unit, 212: determination threshold value setting unit, 214: distribution width calculation unit, 216: characteristic change determination unit.

The invention claimed is:

1. A characteristic change detection device of a steering transmission system, the characteristic change detection device comprising:
    a detection unit for detecting a zero point of a steering angle of a steering wheel;
    a history holding unit for recording a detection history of zero points; and
    a characteristic change determination unit for determining whether or not a characteristic change caused by backlash in the steering transmission system occurs in the steering transmission system based on a width in the detection history of the zero points.

2. The characteristic change detection device according to claim 1, further comprising a difference calculation unit for calculating a difference between arbitrary two points among zero points included in the detection history, wherein
    the characteristic change determination unit determines whether or not a characteristic change occurs in the steering transmission system based on a calculation result provided by difference calculation unit for calculating a difference between arbitrary two points.

3. The characteristic change detection device according to claim 2, wherein
    the arbitrary two points are a maximum value and a minimum value among zero points included in the detection history.

4. The characteristic change detection device according to claim 3, further comprising a threshold value setting unit for setting a threshold value used to determine a characteristic change in the steering transmission system, wherein
    the characteristic change determination unit determines that a characteristic change occurs in the steering transmission system when the difference between the maximum value and the minimum value among zero points exceeds a predetermined threshold value, during a predetermined period from updating of the maximum value and the minimum value among zero points.

5. The characteristic change detection device according to claim 4, wherein
    the threshold value setting unit calculates the threshold value based on a lateral acceleration, a yaw rate, and a speed of a vehicle.

6. The characteristic change detection device according to claim 4, wherein
    the history holding unit discards a maximum value and a minimum value of zero point detection values at predetermined intervals.

7. The characteristic change detection device according to claim 1, further comprising a distribution width calculation unit for calculating a distribution width of zero points detected in a predetermined time period when a predetermined number or more of zero points are detected in the predetermined time period by the detection unit, wherein
    the characteristic change determination unit determines that a characteristic change occurs in the steering transmission system when the distribution width is greater than or equal to a threshold value.

8. The characteristic change detection device according to claim 5, wherein the history holding unit discards a maximum value and a minimum value of zero point detection values at predetermined intervals.

* * * * *

UNITED STATES PATENT AND TRADEMARK OFFICE
CERTIFICATE OF CORRECTION

PATENT NO. : 9,290,205 B2
APPLICATION NO. : 14/398892
DATED : March 22, 2016
INVENTOR(S) : Takeshi Kanou et al.

Page 1 of 1

It is certified that error appears in the above-identified patent and that said Letters Patent is hereby corrected as shown below:

ON THE TITLE PAGE (87) PCT Pub. No.: delete "WO2013/145790" and insert -- WO2013/175790 --, therefor.

Signed and Sealed this
Twenty-first Day of June, 2016

Michelle K. Lee
*Director of the United States Patent and Trademark Office*